United States Patent [19]
Keller

[11] 3,781,650
[45] Dec. 25, 1973

[54] METHOD AND APPARATUS FOR REDUCING INTERFERENCE IN A SPIN RESONANCE SPECTROMETER BY SUBTRACTING INTERFEROGRAMS HAVING 180° PHASE SEPARATION

[75] Inventor: Toni Keller, Fallanden, Switzerland

[73] Assignee: Spectrospin A.G., Zurich-Fallanden, Switzerland

[22] Filed: May 9, 1972

[21] Appl. No.: 251,708

[30] Foreign Application Priority Data
May 28, 1971 Germany.................. P 21 26 743.6

[52] U.S. Cl. .......................... 324/0.5 R, 324/0.5 A
[51] Int. Cl. ......................................... G01n 27/00
[58] Field of Search .................. 324/0.5 A, 0.5 AC, 324/0.5 R

[56] References Cited
UNITED STATES PATENTS
| | | | |
|---|---|---|---|
| 2,968,762 | 1/1961 | Schuster | 324/0.5 R |
| 3,581,191 | 5/1971 | Anderson | 324/0.5 AC |
| 3,376,499 | 4/1968 | Freeman | 324/0.5 A |

Primary Examiner—Robert J. Corcoran
Attorney—Dean S. Edmonds et al.

[57] ABSTRACT

A method and apparatus are described for reducing interference in the receiver of a spin resonance spectrometer. The apparatus generates a first set of RF excitation pulses of one phase angle and a second set of RF pulses having a phase angle that is 180° different. The interferograms formed by one set of these pulses are then subtracted from those formed by the other in a signal averager.

9 Claims, 4 Drawing Figures 3,781,650

METHOD AND APPARATUS FOR REDUCING INTERFERENCE IN A SPIN RESONANCE SPECTROMETER BY SUBTRACTING INTERFEROGRAMS HAVING 180° PHASE SEPARATION

BACKGROUND OF THE INVENTION

In certain methods for studying and recording spin resonance spectra by pulse excitation, RF pulses of very short duration and high output power are used to excite a spin system in a sample under investigation. These signals can cause disturbances in the spectrometer receiver that have a frequency related to their pulse repetition rate. As is also known, spin echoes may be produced by such excitation with a sequence of pulses. In addition, in such methods it is standard practice to turn the spectrometer receiver off during the period in which each pulse excites the sample. This switching on and off of the receiver produces interference-causing transients. Finally, interference may occur in a signal averager in the spectrometer receiver. As a result, the interferogram formed in the signal averager is a product of signals received from the sample heterodyned with interference signals.

SUMMARY OF THE INVENTION

To reduce this interference, a spin system in a sample is excited in accordance with the invention by two sets of RF pulses, a first set having pulses of one phase angle and a second set having pulses of a second phase angle that is 180° different from that of the first set of pulses. The received interferograms (or free precession decay signals) produced by the second set of pulses are then subtracted in the signal averager from the received interferograms produced by the first set of pulses. As a result, the signals received from the excited sample are summed while the interference signals are canceled out.

In accordance with the method of the invention, the information signals resulting from excitation of the sample by the first and second sets of RF pulses are 180° out of phase with each other, whereas the interference components of the received interferograms are in phase with each other. Consequently, when an interferogram formed by a pulse of the second set is subtracted from an interferogram formed by a pulse of the first set, the signals received from the excited sample are added. At the same time, the interference signals are subtracted and therefore substantially eliminated.

Any number of interferograms may be combined in this manner to minimize distortion due to interference. For best results, the first and second sets of RF pulses should have equal numbers of pulses. In one embodiment of the invention, the pulses may alternate with one another so that every pulse is phase shifted 180° from adjacent pulses. In another embodiment, sets of pulses having one phase angle may alternate with sets of pulses having the other phase angle. Thus the present invention may readily be practiced with "deft" and "seft" cycles by using pulses of one phase angle during one cycle and pulses of the other phase angle during the next cycle.

The phase of each pulse may also be varied stochastically. This has the advantage of suppressing interference at a frequency that is in rational proportion to the pulse repetition rate. It will be understood that approximately half the pulses should have one phase angle and the other half should have a phase angle shifted by 180° from that of the first half.

The first and second sets of RF pulses may be generated by modulating an RF signal with modulation pulses of varying polarity. This makes it possible to practice the method of the invention with conventional spin resonance spectrometers having an RF oscillator, an RF modulator, and a pulse generator which supplies the modulating signal. The pulse generator may readily be adjusted so that it supplies either alternating or stochastically distributed pulses of opposite polarity. Interferograms formed by the first and second sets of RF pulses may then be subtracted from each other by applying control pulses of opposite polarity to a signal averager. Again, this makes it possible to execute the invention using conventional spin resonance spectrometers.

BRIEF DESCRIPTION OF THE DRAWING

These and other objects, features, and elements of my invention will become more readily apparent from the following description of the drawing in which.

DETAILED DESCRIPTION OF THE INVENTION

Figure 1:
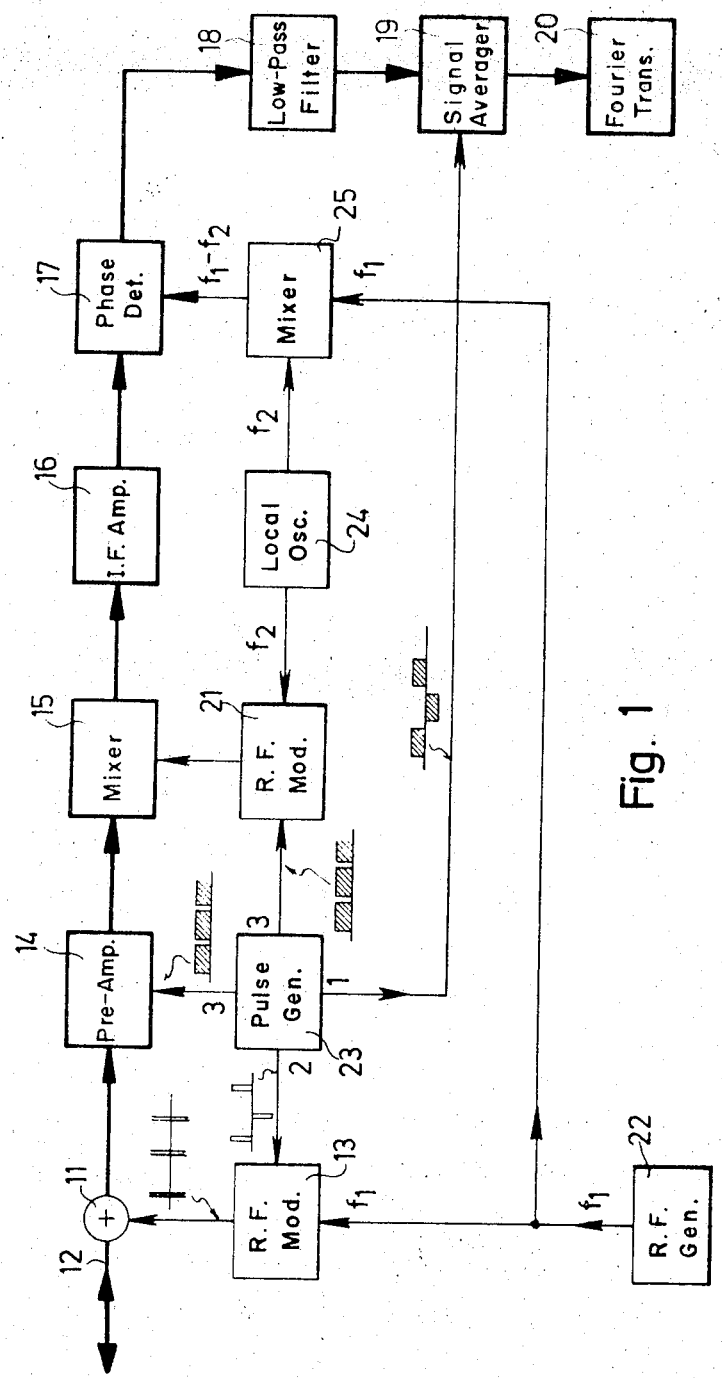
FIG. 1 is a block diagram of an embodiment of the invention.

FIG. 1 is a block diagram of portions of a preferred embodiment of the transmitter and receiver of a spectrometer system in accordance with the invention. In the transmitter, an RF signal of frequency $f_1$ is produced by RF generator 22 and applied to an RF modulator 13, where it is modulated by a train of pulses from pulse generator 23 to form a train of RF pulses. These pulses are applied through a branch (or summing) point 11 and a cable 12 to the sample head of the spectrometer (not shown).

The receiver comprises a preamplifier 14, a mixer 15, an IF amplifier 16, a phase detector 17, a low-pass filter 18, a signal averager 19, and a Fourier transformer 20 connected in series. A local oscillator 24 produces an RF signal of frequency $f_2$ that is applied to both an RF modulator 21 and a mixer 25. The RF signal applied to RF modulator 21 is pulse modulated by pulses from pulse generator 23 and the resulting pulse modulated RF signal is applied to mixer 15. The RF signal of frequency $f_2$ is mixed in mixer 25 with the RF signal of frequency $f_1$ from RF generator 22. The resulting difference frequency signal $f_1 - f_2$ is applied to phase detector 17. As will be detailed below, pulse signals from pulse generator 23 are also applied to preamplifier 14 and to signal averager 19.

In operation of the spectrometer, RF pulses from RF modulator 13 are applied to the sample head to excite the spins of a sample. A free precession decay signal, or interferogram, produced by these spins is amplified in preamplifier 14 and heterodyned in mixer 15 with the RF signal supplied by second RF modulator 21 to produce an intermediate frequency signal. This intermediate frequency signal is amplified in IF amplifier 16, rectified in phase detector 17, and passed through low-pass filter 18. As will be detailed below, the signal is then combined in signal averager 19 with signals previously stored therein. The resulting average interferogram is then processed in Fourier transformer 20 to compute the resonance frequencies of the interferogram.

Figure 2:
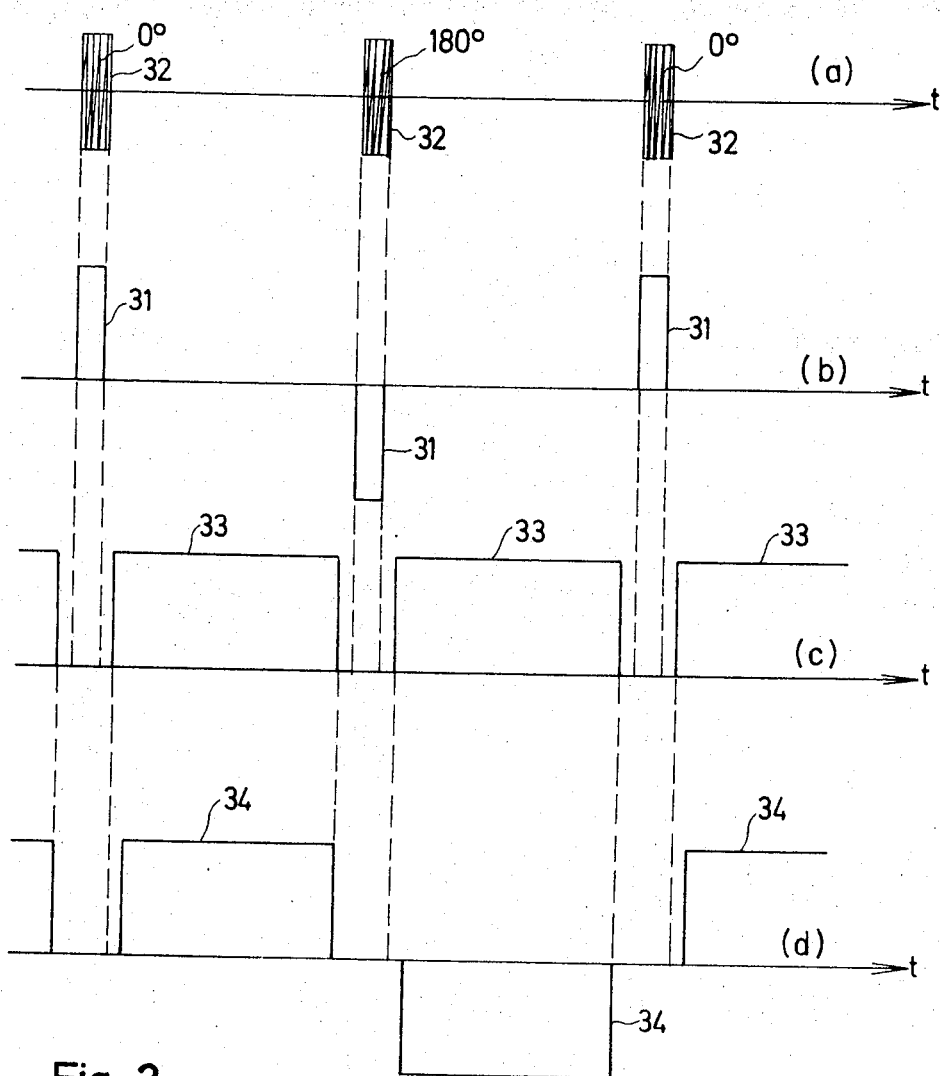
FIGS. 2–4 are diagrams illustrating the method of the invention.

As shown in FIGS. 1 and 2, pulse generator 23 produces at its output 2 narrow rectangular pulses 31 of alternating polarity. Consequently, RF modulator 13 produces RF pulses 32 having a phase shift of 180° between successive pulses. Thus, if the phase angle of the RF oscillation at the beginning of the first RF pulse is 0°, then the phase angle of the RF oscillation at the beginning of the second RF pulse is 180°, as shown in FIG. 2(a). Pulse generator 23 also produces at its output 3 starting pulses 33 (FIG. 2(c)) all having the same polarity. These pulses are applied both to preamplifier 14 and to second RF modulator 21 to turn the receiver on. The beginning of each starting pulse 33 is delayed with respect to the end of the immediately preceding pulse 31 to insure that the RF pulses cause as little interference in the receiver as possible.

Pulse generator 23 also produces at its output 1 switching pulses 34 that are applied to signal averager 19. Because some interference may still be present in the receiver, the beginning of each switching pulse 34 is again delayed slightly with respect to the beginning of the associated starting pulse 33 (FIG. 2(c) and 2(d)). In addition, like pulses 31, switching pulses 34 alternate in polarity. The polarity of each switching pulse determines the sign with which the concurrently produced interferogram is combined in signal averager 19.

Figure 3:
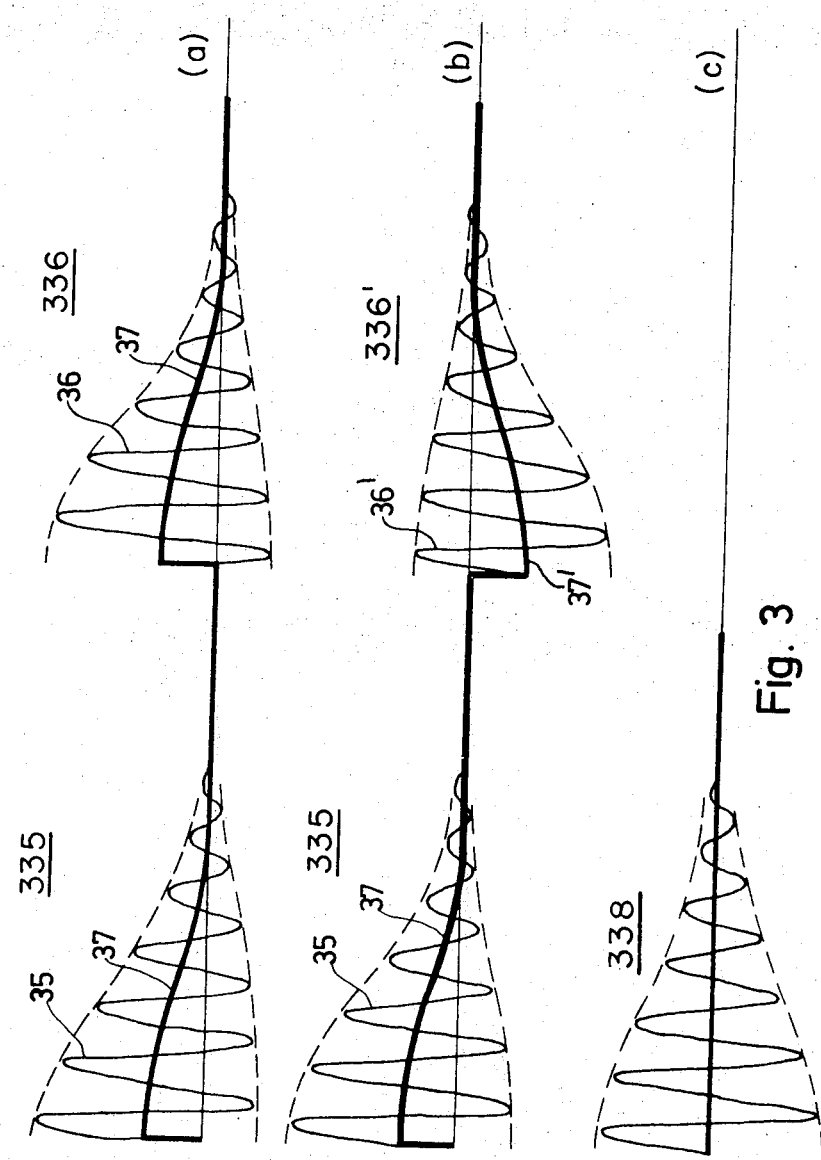

The combining of interferograms in signal averager 19 is best understood in conjunction with FIG. 3. FIG. 3(a) shows part of the input received by signal averager 19: two consecutive interferograms 335, 336 obtained from successive RF pulses 32. Each received interferogram 335,336 is the result of heterodyning a signal 35, 36 received from the sample with a signal 37 representing interference inherently generated within the system. Because the phase of successive RF pulses 32 differs by 180°, the received signals 35,36 from the sample have phase angles shifted from one another by 180°. However, because the interference signal 37 is essentially due to transients, it is independent of the phase angle of the RF pulse 32.

Signal averager 19 adds each received interferogram to previously received interferograms with a sign determined by the polarity of the pulses in switching signal 34. In effect, it subtracts one interferogram from the other. Specifically, as shown in FIG. 3(b), signal averager 19 stores one of two consecutive interferograms as a stored interferogram 335 that is the same as the received interferogram 335. The other interferogram, however, has its sign reversed to form a stored interferogram 336' that is the inverse of the received interferogram 336. This inversion changes received signal 36 and interference signal 37 to stored signal 36' and interference signal 37'. As a result, the phase of signal 36' is the same as the phase of signal 35 in recorded interferogram 335. However, interference signal 37' in stored interferogram 336' is the negative of interference signal 37. Consequently, signals 35 and 36' in the two consecutive stored interferograms 335, 336' are summed in signal averager 19 while interference signals 37, 37' are subtracted from each other. The interference signals are therefore substantially eliminated and, as shown in FIG. 3(c) an average interferogram 338 free of interference is obtained at the output of signal averager 19.

As will be obvious to those skilled in the art, any desired number of interferograms may be combined in this manner to obtain an interference-free average interferogram. It is only necessary that there be substantially as many RF pulses 32 of one polarity as there are of the other. It is irrelevant to the end result whether the polarity of RF pulses 32 and switching pulses 34 alternates strictly, is periodic in groups of equal number, or fluctuates stochastically. The use of a stochastic pulse sequence, for example one having the phase angles 0°, 180°, 180°0°, 180°, 0°, 0°, 0°, 180°, . . . has the advantage that it also suppresses interference signals having a frequency that is in rational proportion to the pulse repetition rate. It is necessary, however, that RF pulses 32 and switching pulses 34 change polarity at the same time.

The invention may also be practiced where spins are excited by pulse cycles, i.e., periodically repeated pulse sequences having various pulse widths and various phase angles. In this application, the phase angle is shifted periodically or stochastically between every cycle instead of every pulse.

Figure 4:
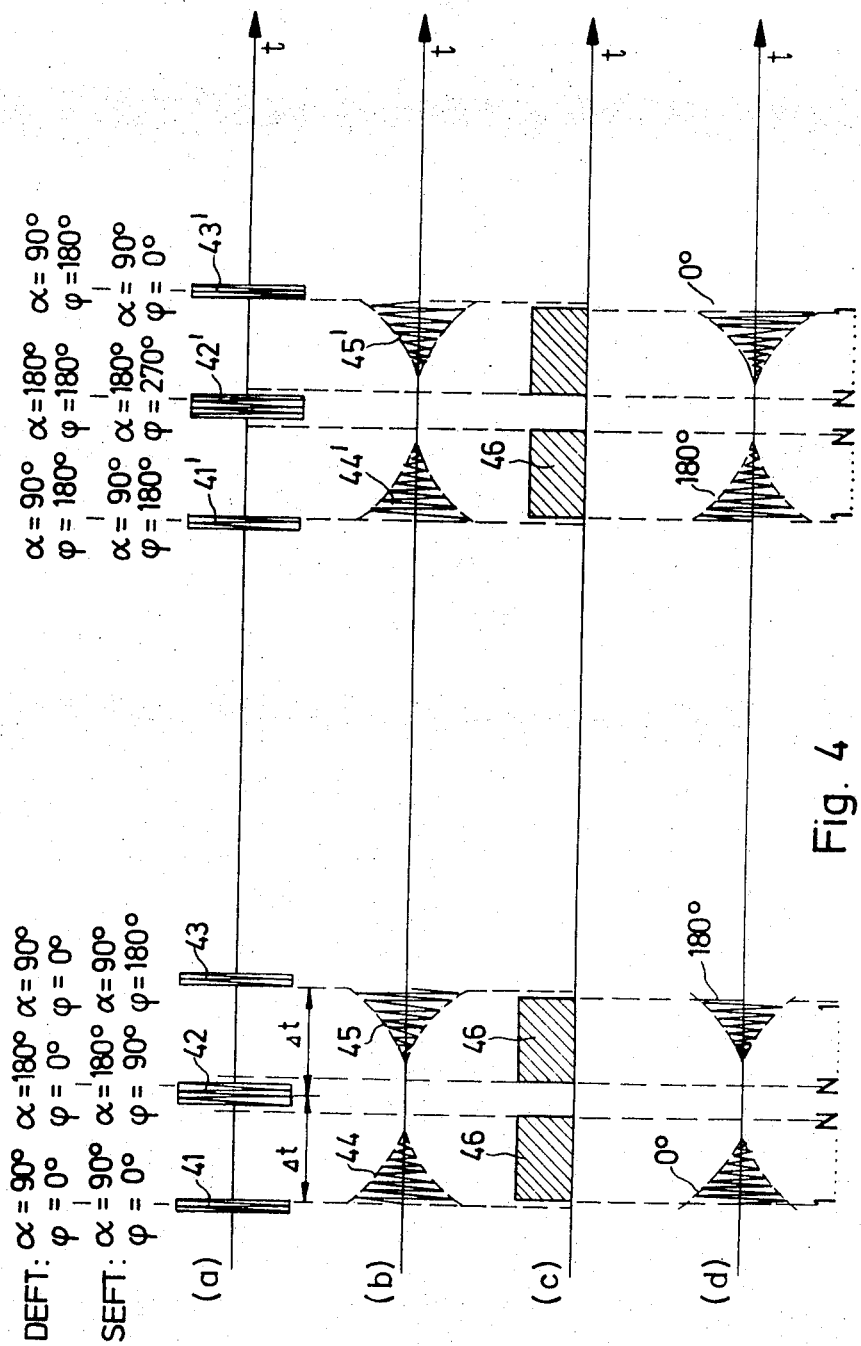

FIG. 4 illustrates the use of such pulse cycles known as "deft" and "seft" cycles, each of which consists of a sequence of equally spaced pulses of three values. For the deft cycle, the pulses all have the same phase angle, whereas in the seft cycle the phase angle changes by 90° from pulse to pulse. In both cycles, the duration of the pulse is selected so that the first pulse causes the spin moment to turn 90°, the second pulse causes it to turn 180°, and the third pulse causes it to turn 90°. FIG. 4(a) illustrates such a cycle. By exciting the spins with the first 90° pulse, the magnetizing vectors are turned from the z direction into the x–y plane (referring to the spatial description conventionally employed in NMR). In the subsequent precession of the spins there is a fanning out of the individual magnetizing vectors, resulting in a dying out of the precession oscillations. The second pulse of the cycle turns the fanned out magnetizing vectors by 180°, causing the magnetizing vectors to join together again so that a precession oscillation known as an "echo" builds up once more. As soon as nearly all magnetizing vectors are lying in the same direction and the echo has thus reached its maximum amplitude, the magnetizing vectors are turned once more in the z direction by a third pulse, at 90° pulse.

The resulting interferograms are illustrated in FIG. 4(b) under the three pulses 41–43 of the cycle. Interferogram 44, which is formed after the first 90° pulse, has a decreasing amplitude. Echo 45, which arises from the 180° pulse, increases in amplitude. Echo 45 is terminated by the third 90° pulse 43. FIG. 4(c) shows a starting pulse 46 that turns on the receiver of the spectrometer to record interferograms 44,45. As shown in FIG. 4(d), interferogram 44, which has a phase angle of 0°, is stored in address locations 1 to N of signal averager 19. Interferogram 45, which is phase shifted by 180° with respect to interferogram 44 and has an increasing instead of decreasing amplitude, is stored in the same storage locations but in reverse order and with reverse sign.

In practicing the invention, pulse 41'–43' of a subsequent cycle are phase shifted by 180°. As a result, interferogram 44' is phase shifted by 180° compared to interferogram 44 and therefore is stored at addresses 1 to N with the reverse sign. In other words, interferogram 44' is subtracted from interferogram 44. At the same time, interferogram 45' is not phase shifted and therefore is stored with the same sign at address locations N to 1. Consequently, interferogram 45 is subtracted from interferogram 45'.

As will be apparent to those skilled in the art, numerous other modifications may be made to the preferred embodiments described and illustrated herein without departing from the scope of the invention as defined in the claims.

What is claimed is:

1. A method for recording spin resonance spectra, comprising:

exciting a spin system of a sample with a first set of RF pulses having a first phase angle and a second set of RF pulses having a second phase angle that is 180° different from the first phase angle;

receiving interferograms containing the resonance frequencies of the spin system excited by the first and second sets of pulses; and subtracting an interferogram formed by one of the first and second sets of RF pulses from an interferogram formed by the other set to obtain a mean value thereof.

2. The method of claim 1 wherein the pulses of the first and second sets of RF pulses alternate with each other.

3. The method of claim 1 wherein the phase of each pulse is determined stochastically.

4. The method of claim 3 wherein the first and second sets of RF pulses have approximately equal numbers of pulses.

5. The method of claim 1 including the step of generating the first and second RF pulses by modulating an RF signal with modulation pulses of alternating polarity.

6. The method of claim 1 further comprising the step of Fourier analyzing the mean value interferogram to determine the component resonance frequencies thereof.

7. Apparatus for recording spin resonance spectra comprising:

a spin resonance spectrometer including an RF oscillator, a pulse generator, an RF modulator for pulse modulating the output of the RF oscillator, and a signal averager for averaging interferograms produced in response to each excitation pulse to obtain the mean value thereof;

means in said pulse generator for forming pulses of opposite polarity;

means for applying said pulses of opposite polarity to the RF modulator; and means for applying corresponding pulses of opposite polarity to the signal averager for controlling the sign of the addition operation performed thereby.

8. The apparatus of claim 7 including means for forming pulses of opposite polarity that alternate with each other.

9. The apparatus of claim 7 including means for forming pulses having stochastically determined phase angles.

* * * * *